July 21, 1959  R. G. RUSSELL  2,895,789
METHOD FOR PRODUCING COATED GLASS FIBERS
Filed Dec. 28, 1956  2 Sheets-Sheet 1
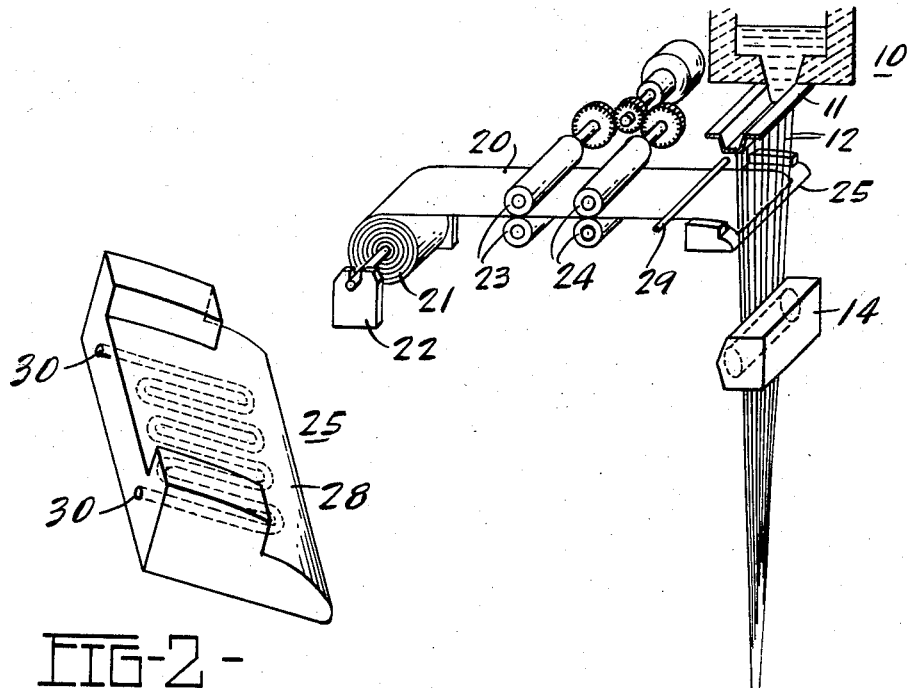
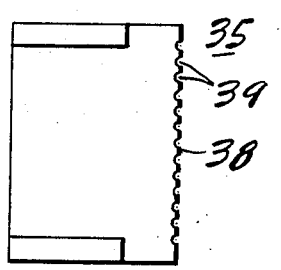
FIG-2-
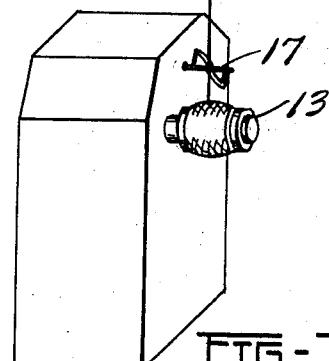
FIG-3-
FIG-1-
Inventor:
ROBERT G. RUSSELL
By
Hackin & Overman
Attys.

July 21, 1959 R. G. RUSSELL 2,895,789
METHOD FOR PRODUCING COATED GLASS FIBERS
Filed Dec. 28, 1956 2 Sheets-Sheet 2
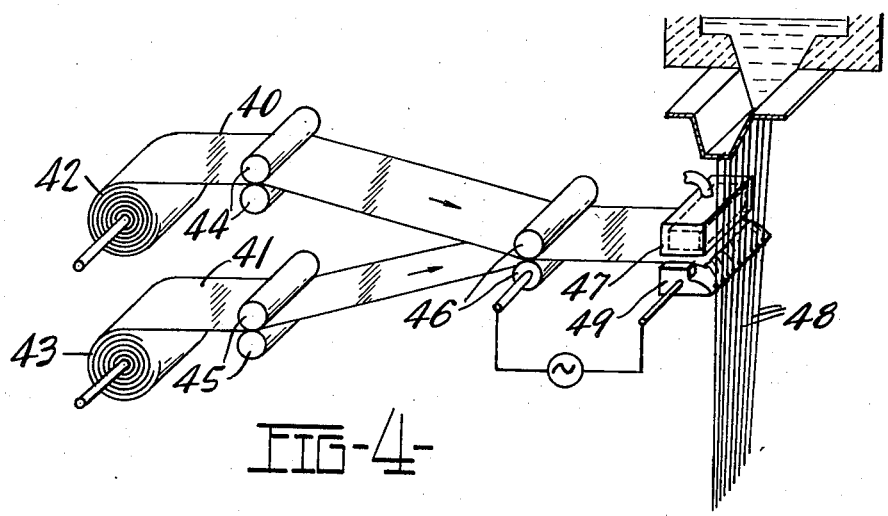
FIG-4-
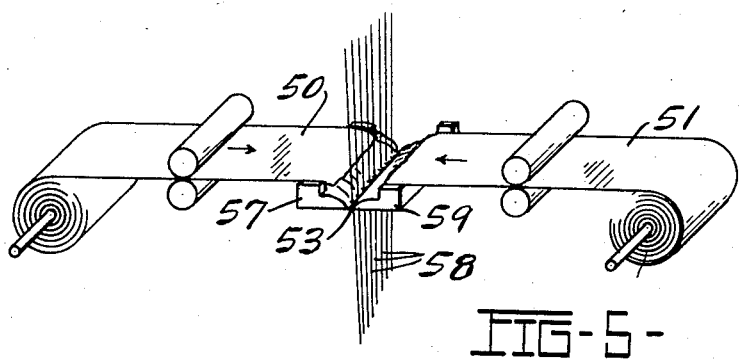
FIG-5-
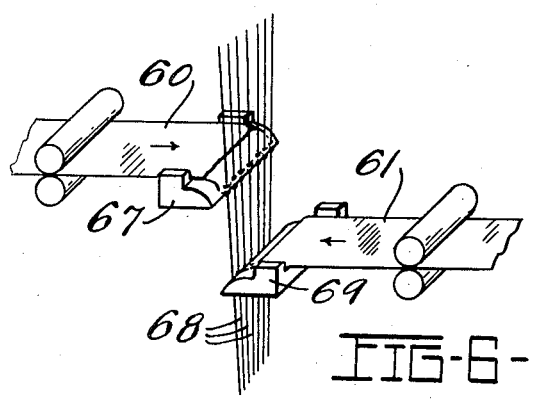
FIG-6-
Inventor:
ROBERT G. RUSSELL.
By
Attys.

United States Patent Office 2,895,789
Patented July 21, 1959

2,895,789

METHOD FOR PRODUCING COATED GLASS FIBERS

Robert G. Russell, Granville, Ohio, assignor to Owens-Corning Fiberglas Corporation, a corporation of Delaware Application December 28, 1956, Serial No. 631,097

7 Claims. (Cl. 18—54)

This invention relates to glass fibers, particularly a method for producing coated glass fibers and more particularly to a method for producing coated glass fibers with metered quantities of coating material for preservation of the physical properties of the fibers.

This application is a continuation-in-part of my co-pending application, Serial Number 393,580, filed November 23, 1953, now Patent No. 2,782,563.

The coating of glass fibers with material such as metal and certain resins, it has been found, is of tremendous value in increasing the usable strength of the fibers. It is well established that glass filaments have extremely high tensile strength, measurements having been made in which the rupture strengths exceeded one-million pounds per square inch. Additionally, the flexing characteristics of individual fibers are also highly desirable since practically no yield takes place in such fibers. Glass fibers, however, have a weakness to surface abrasion which reduces their over-all ability to withstand movement in contact with each other or against other materials, thereby reducing the number of applications to which their otherwise high tensile and flex strengths might be desirably applied. The coating of glass fibers with metal such as copper, zinc, aluminum, silver or alloys thereof, it has been found, successfully provides the protection of the glass surface against abrasion, thereby enhancing the use possibilities of the fibers in many instances to which they otherwise could not be adapted.

Resin coatings also provide such protection making the fibers further adaptable to uses to which they otherwise could not be adapted. Resins such as polyethylene and tetrafluoroethylene are both of considerable importance in this respect and successfully applicable as coatings according to the method herein described.

In view of the foregoing, it is an object of this invention to provide a new method for economically producing coated glass fibers.

Another object of this invention is to provide a novel method for applying coatings on glass fibers which are adaptable to production of such fibers at a high rate of speed in conventional fiber-forming processes.

Another object of the invention is to provide a method for applying coatings to glass fibers during forming and which provide controls permitting establishment of desired temperature relations between the coating material and the heated glass filaments at the point of application of the material.

In brief, the principles of the invention entail coating glass fibers with heat softenable material such as metals like aluminum, lead or tin, or resins like polyethylene and tetrafluoroethylene in foil or sheet form into contact with the heated fibers as they are being formed. This concept, according to the present invention, resolves itself into preheating and melting the coating material as it is being fed to the filaments and regulating its temperature to permit a mating of the coating material with the filaments at temperatures which are conducive to establishment of optimum conditions for coating the filaments.

The terminology "heat of formation" as used herein means the heat of the glass associated with the formation of glass fibers or the heat residing in the freshly formed fibers. The principles of the invention are herein disclosed in the first instance by reference to an embodiment in which sheet metal supplied to the fibers is preheated by conduction from electrically heated means. It will be recognized, however, that other heating means might be used. For instance, the sheet material might be passed through a heated chamber or electrical current can be passed directly through the sheet. Induction heating or direct application of heat as from a flame can also be resorted to. In referring to "sheet material" in the present description and following claims, it is to be understood that metals in "foil" form are also intended.

A feature of the invention is the rapidity with which the desired temperature can be imparted to the sheet material thus making the method and means flexibly adaptable to providing the physical properties controllable by selection of particular temperature relations between the coating material and glass fibers.

Still another feature of the invention lies in its adaptability to provide different thicknesses of coating material on the glass fibers.

Other objects and features which I believe to be characteristic of my invention are set forth with particularity in the appended claims. My invention, however, both in organization and manner of construction together with further objects and advantages thereof may be best understood by reference to the following description taken in connection with the accompanying drawings in which:

Figure 1 is a somewhat schematic view in perspective of apparatus for forming coated glass fibers in accordance with the principles of the present invention;

Figure 2 is an enlarged perspective view of the applicating shoe shown in Figure 1;

Figure 3 is a plan view of a modified form of part of the apparatus in Figure 1 illustrating another form of shoe by which sheet metal or other heat softenable sheet material may be fed to glass fibers during forming;

Figure 4 is still another view of apparatus for coating fibers in accordance with the principles of this invention wherein more than one material may be applied to the fibers simultaneously;

Figure 5 shows another arrangement whereby two materials can be coated on the fibers by applicators supplying coating materials from opposite sides of the fibers; and Figure 6 shows another arrangement for supplying materials for coating of fibers wherein two applicators supplying coating materials are disposed at different levels in the path of the fibers.

Turning to the drawings in detail, Figure 1 shows a general layout of apparatus for producing coated fibers, including a suitable glass melting tank 10 having a feeder 11 provided with a series of outlets in its bottom from which flow a plurality of streams 12 of molten glass. The outlets are preferably arranged in one or two rows so that the streams are all substantially in the same plane. As the streams flow from the outlets they are drawn out into fibers or filaments by means of a rotating drum or collet-supported collecting tube 13 which winds the fibers thereon in strand form and also supplies the force of pulling the filaments to draw out the streams 12. A gathering member 15 for collection of the filaments into a group or strand 16 is provided in a position intermediate the source of the streams 12 and the collecting tube 13. The member 15 as shown is a spinner made of material such as graphite or a plastic such as tetrafluoroethylene and the like.

Sizing materials may be applied to the filaments as they are gathered into the strand at the gathering member 15 or they may be applied separately such as from a roll applicator 14 located at a suitable level of application above the gathering member. Sizings such as those set out in United States Patent 2,234,986, issued on March 18, 1941, may be applied, or where metal coatings exist on the fibers, material may be applied which is more lubricant in nature such as petroleum oil, vegetable oil, molybdenum disulfide or other lubricants.

Traversal of the strand to form a package during winding may be effected by suitable traversing means such as a spiral-wire traverse 17 arranged to sweep the strand back and forth across the collection tube with each revolution.

The described apparatus for forming the glass fibers is preferred over other fiber-forming and collecting means because the fibers can be formed at extremely high rates of speeds thereby promoting and enabling manufacture at extremely economical values. Coating material is applied to the fibers at a point intermediate the outlets from the feeder 11 and the gathering member 15 and when the material is metal, it is supplied in foil or sheet form 20 substantially equal or slightly greater in width than the width of the fan of fibers at the point of application. The sheet is withdrawn from a roll 21 mounted in a support structure 22 located for convenient withdrawal by two sets of feed rolls 23 and 24.

The average temperature of molten glass in the manufacture of most glasses used in textile fibers is in the order of 2300° F. At points a considerable distance below the feeder outlets, this temperature drops to that of the surrounding atmosphere. By reason of the fact that the drop in temperature of the filaments extends over a considerable distance of the fan of fibers, a range of temperature levels exists for selection of the proper temperature for application of specific materials which in many instances predetermines the physical properties of the combination of glass and coating material. The relationship of the temperature of the coating material to that of the glass at the point of application proves important since the strength of the glass fibers may be impaired by material temperatures of too high a value. That is, the level at which the coating material is applied to the fibers is in practice selected by the properties desired in the final product and is accomplished by raising and lower the feeding rolls and shoe applicator to introduce the sheet at the points on the fibers where the desired temperature is existent.

The feed rolls 23 and 24 are driven by a vari-speed electrical motor through a gear train. The primary tension for removal of the sheet from the roll 21 is effected by the rear set of rolls 23, while the front set of rolls 24 act primarily to guide and progressively feed the sheet over the face of a shoe-type applicator 25. The rolls are made of suitable material such as neoprene or silicone rubber capable of operating at elevated temperatures under sufficient pressure to establish positive frictional engagement with the sheet and thereby assure a positive uniform passage of the sheet over the shoe 25.

The shoe 25, as shown in Figure 2, is provided with laterally disposed surface projections which also act to guide movement of the sheet or flow of molten coating material downwardly in the direction desired if the material fluidity is reached before contact with the filaments. The shoe is provided with a pair of electrical terminals connected to a heating unit embedded therein which allows control of the shoe temperature to promote preheating of the sheet as it makes contact therewith and which is capable of raising the temperature sufficiently to assure melting of specific coating material at the applicating edge 28 of the shoe 25. A water cooled tube 29 is adjustably disposed adjacent the upper roll of the forward set of rolls 24 and extending parallel to its across the width of the sheet near the point of introduction of the coating material to the shoe 25. The cooling tube acts to prevent the conduction of heat from the shoe as well as from the filaments back along the length of the sheet 20 which might otherwise prematurely heat the coating material at points behind the shoe.

In operation, the speed of the feed rolls is made such as to supply sufficient coating material at the leading edge 28 of the shoe to fully coat the individual filaments drawn thereover in engagement therewith. The applicating shoe 25 is angularly disposed with regard to the filaments to assure a gravity flow of molten coating material to the leading edge. Angular disposition of the shoe also has the feature that heat from the filaments and streams 12, as well as the bushing 11 and forming cones, is transmitted by radiation directly to the sheet surface to promote preheating of the sheet as it passes over the shoe. Such preheating, of course, is progressively intensified as the coating material approaches more closely to the point of application of the filaments. In addition to the inherent preheating provided by the arrangement, the heater unit incorporated within the applicator shoe itself is utilized to permit more exact control of the coating material temperatures at the point of application on the leading edge 28. In this respect, it should be noted that the water cooled tube 29 additionally provides control in the event that rapid cooling is desired such as by supply of water at a more rapid rate when the rate of introduction of metal to the filaments is greatly reduced.

In operation coatings are applied according to this invention by perheating the sheet of coating material on the shoe sufficiently to melt it before contact with the filaments. Under these conditions the material upon being melted flows downwardly to the leading edge 28 where an accumulation is formed through which the filaments are drawn for the desired coating of each.

Figure 2 is an enlarged perspective view of the shoe 25 showing more clearly that the leading edge 28 is rounded. Conductors leading to the terminals 30 located to the rear of the shoe provide the means for connection to the heating unit embedded within the shoe.

Figure 3 is an illustration of another form of shoe 35 similar to that shown in Figures 1 and 2, except that grooves are provided at the leading edge 38 through which the filaments of glass may be drawn for application of a coat of metal therein. Grooves 39 serve to act as retaining cavities or pockets for suspension of molten metal by its own surface tension as it is melted, and also serves as means whereby the filaments may be drawn through the metal so as to fully surround the filaments to be coated. Additionally, the grooves can be used to guide the filaments in their passage to the gathering and winding equipment.

Although as indicated previously, specific methods of heating the sheet material are illustrated, it will be recognized that still other means are possible within the concepts of the invention. For example, when the coating material is electrically conducting, the heating might be effected by passage of electrical current through the sheet portion between the two feed rolls 23 and 24, or by application of voltages of opposite potential to the upper and lower rolls of the set 24. Additionally, electrical induction means may be used to preheat the sheet for any length before or following introduction to the applicator shoe. Supply rolls might also be associated directly with the applicating shoe between which voltages might be established for heating of the sheet.

The method of the invention, however, is not limited to coating of fibers with electrically conducting materials since resins such as polyethylene, vinyl ester, vinyl chloride, vinyl acetate copolymer, vinylidine chloride, the acrylics, polystyrene, and tetrafluoroethylene can also be coated on fibers by the process.

More than one sheet of coating material can be melted down simultaneously and coated on the fibers at the leading edge or face of an applicator. As shown in Figure 4, two dissimilar coating materials in sheet form 40 and 41 are first withdrawn from supply rolls 42 and 43, respectively, by pairs of feed rolls 44 and 45, respectively. The two sheets are then joined at still another pair of feed rolls 46 and 47 from which the material is fed to an applicator 49 where the two dissimilar sheets are heated to a molten condition for application to continuous fibers 48 drawn across the leading edge of the applicator. The three sets of feed rolls 44, 45 and 46 are synchronized in withdrawing materials from the supply rolls 42 and 43 and may be regulated in their rate of withdrawal to suppy molten material to the applicator face at rates synchronized to the speed of the fibers drawn over the applicator face to effect a continuous coating thereof. In this arrangement, the applicator 49 has a heating unit 47 associated therewith for heating the topmost sheet 40 on the applicator. The heating unit 47 may be electrically heated, if desired, or can be heated by gas or other fuel supplied to heating elements adapted to transfer of heat to the topmost sheet. In this respect, gas radiant burners can be incorporated in the heater. The combination of the heat supply by the applicator 49 with that supplied by the overlying heater unit 47 melts both of the coating materials on the applicator 49 allowing both to flow over the face of the applicator to its leading edge, where depending on their properties, they may intermix upon being coated on the fibers, or if they are immiscible and of different densities, can be applied to the fibers as two coatings, one over the other on such fibers. The two sheets 40 and 41 can be metals which will alloy together, and in this respect, they can be alloyed together at the leading edge of the applicator upon application to the fibers. Resins and metals can be applied to the fibers in this manner also. For example, an epoxy resin might be coated on the fibers along with metals such as lead or zinc.

When either one or both sheets of coating material are electrically conductive, a potential can be established between the feed rolls 46 and the applicator 49 in combination with its heating unit 47 to develop a complete electrical circuit for passage of current through the sheets between the feed roll 46 and the applicator to effect preheating thereof prior to passage over the applicator. Then upon reaching the applicator, sufficient heat is supplied to both sheets to melt down the two materials to permit both to flow to the applicator face for the coating of fibers.

Metals such as zinc and lead in sheet form can be melted and alloyed together for coating of fibers in this way. Copper and aluminum can also be alloyed together in this manner, as well as copper and tin, and lead and tin. Where a greater proportion of one such metal is to be alloyed than the other, the metal sheet of that to be supplied in greatest amount is accordingly arranged to be proportionately thicker. Where one sheet requires more heat for melt down than the other, the heat supplied by either the applicator or its associated heater unit can correspondingly be increased, depending upon which of the two sheets, the topmost or the underlying sheet, requires the most heat. The two sheets can also be arranged to be fed at different rates, if desired, depending upon which is required in greatest quantity.

Sheets of metal can also be fed simultaneously from opposite sides of the filaments, if desired. Additionally, different metals may correspondingly be fed simultaneously from opposite sides of the filaments to be alloyed thereon. For instance, a low-melting eutectic type alloy may thus be coated on the filaments. An arrangement for accomplishing this method is illustrated in Figure 5 wherein two applicators 57 and 59 of the type shown in Figure 1 are disposed directly opposite each other on opposite sides of a fan of fibers 58. Sheets of either similar or dissimilar materials 50 and 51 are fed over the applicators 57 and 59, respectively, whereon each is melted and flows to the leading edge or face of its applicator for combination with the molten material of the opposite applicator in a globular strip 53 through which the fibers 58 are drawn for receipt of the coating materials.

The metal sheets or foils fed to the fibers in each arrangement herein described can be precoated with special compositions which act as fluxes. For example, a coating composition containing lead borate when coated on the sheet of coating metal will cause an easier wetting out of the fiber and will establish a stronger bond between the metal and fiber. Volatile materials such as cadmium oxide and lead oxide can also be included in the coatings on the sheets to promote wetting of the fibers. Powdered metal and glass flakes can also be coated on the sheets for application to the fibers along with metal or resin coating materials for purposes such as the decorative effects obtainable therewith.

Figure 6 shows still another arrangement for applying more than one coating material to continuous fibers. The fibers 68 are first drawn over the face of an applicator 67 disposed at one level on a side of the fan of fibers and then are drawn across the face of a second applicator 69 located at a lower level at the opposite side of the fan of fibers. Sheets of material 60 and 61 are fed over the applicators 67 and 69, respectively, to provide dual coatings on each of the fibers. Each of the sheet materials 60 and 61 is heated on its respective applicator to a molten condition prior to its flow to the leading edge or face of its applicator. The distance between the two applicators 67 and 69 can be such that the first coating of material 60 is solidified before the second coating 61 is applied thereover, or, the distance can be such that the coating material 60 is still sufficiently soft that on application of the second coating of material 61 the two will intermix or alloy in the intermediate zone where they mate. Lead can be coated over zinc in this manner to utilize the high abrasion resistance found to exist in lead coatings. Additionally, lead or copper can be applied over tin for improved abrasive resistance. Still further, aluminum can be coated over copper to provide a combination which is less chemically reactive than copper alone.

In view of the foregoing, it will be understood that while I have shown certain particular forms of my invention, I do not wish to be limited thereto since many modifications may be made within the concept of the invention. For example, operation of the applicators in supplying coatings to the fibers could be improved in certain instances by vibrating or oscillating them laterally. This would promote a ready flow of coating material to the fibers and full coating thereof. I, therefore, contemplate by the appended claims to cover all modifications which fall within the true spirit and scope of my invention.

I claim:

1. The method of producing coated filaments of heat softenable mineral material comprising flowing streams of such mineral material from a molten source thereof, attenuating said streams into filaments, progressively feeding a sheet of heat softenable coating material toward said filaments, passing said sheet over a heat supplying coating unit, heating and melting said sheet at said coating unit, flowing the molten material of said sheet to said filaments, and so passing the filaments for envelopment by the molten coating material to provide the desired coatings for the filaments.

2. The method of producing protectively coated filaments of heat softenable mineral material comprising flowing streams of such mineral material from a molten source thereof, attenuating said streams into filaments, progressively feeding at least two sheets of heat softenable coating material toward said filaments, passing said sheets over heat supplying coating means, heating and melting said sheets at said coating means, flowing the molten material of said sheets to said filaments, and so passing the filaments across said coating means that they become enveloped by the combination of molten coating materials to provide the desired protective coatings for the filaments.

3. The method of producing protectively coated glass filaments comprising flowing streams of molten glass from a source thereof, attenuating said streams into filaments, progressively feeding a pair of sheets of heat softenable coating material one over the other toward said filaments, heating and melting said sheets, flowing the molten material of said sheets together to said filaments, and so passing the filaments for envelopment by the molten coating material to provide the protective coatings desired for the filaments.

4. The method of producing protectively coated filaments of heat softenable mineral material comprising flowing streams of such mineral material from a molten source thereof, attenuating said streams into filaments, progressively feeding a pair of sheets of heat softenable coating material toward each other from opposite sides of said filaments, heating and melting said sheets, flowing the molten material of said sheets together to envelop said filaments, and passing said filaments through said molten material to provide the protective coatings desired therefor.

5. The method of producing protectively coated filaments of heat softenable mineral material comprising flowing streams of such mineral material from a molten source thereof, attenuating said streams into filaments, progressively feeding a pair of sheets of heat softenable coating material toward said filaments for application thereto at spaced points along the length of said filaments, heating and melting said sheets, flowing the molten material of said sheets to said filaments, and passing each of said filaments through the molten material of both said sheets, the spacing of points of application of material from said sheets being such that the material of the first sheet is substantially solidified as a coating upon application of the material of the second sheet.

6. The method of producing protectively coated filaments of heat softenable mineral material comprising flowing streams of such mineral material from a molten source thereof, attenuating said streams into filaments, progressively feeding a pair of sheets of heat softenable coating material at spaced points along the length of said filaments toward said filaments, heating and melting said sheets, flowing the molten material of said sheets to said filaments, applying the material of one of said sheets to said filaments at a temperature substantially matched to the temperature of said filaments at the points of application of the material thereto, and applying the material of the other of said sheets to said filaments over the material of said one sheet at points where the material of said one sheet has substantially solidified.

7. The method of protectively coating glass filaments comprising moving a plurality of filaments aligned in generally parallel relation in a common direction, progressively feeding a pair of sheets of heat softenable coating material toward said filaments, heating and melting said sheets, flowing the molten material of said sheets together to said filaments to envelop and coat said filaments as they move through said molten material.

References Cited in the file of this patent

UNITED STATES PATENTS

| | | |
|---|---|---|
| 2,699,415 | Nachtman | Jan. 11, 1955 |
| 2,782,563 | Russell | Feb. 26, 1957 |